United States Patent
Morten et al.

(10) Patent No.: US 8,689,016 B2
(45) Date of Patent: Apr. 1, 2014

(54) TAMPER PREVENTION AND DETECTION FOR VIDEO PROVIDED OVER A NETWORK TO A CLIENT

(75) Inventors: Glenn A. Morten, Bellevue, WA (US); Edward Charles Hiar, Lynnwood, WA (US); Andre Jacobs, Redmond, WA (US); James E. Veres, Woodinville, WA (US); Oscar V. Zhuk, Bellevue, WA (US); Jeffrey Lee Tinker, Kenmore, WA (US)

(73) Assignee: Google Inc., Mountain View, CA (US)

( * ) Notice: Subject to any disclaimer, the term of this patent is extended or adjusted under 35 U.S.C. 154(b) by 725 days.

(21) Appl. No.: 11/565,223

(22) Filed: Nov. 30, 2006

(65) Prior Publication Data
US 2007/0271189 A1    Nov. 22, 2007

Related U.S. Application Data

(60) Provisional application No. 60/741,758, filed on Dec. 2, 2005.

(51) Int. Cl.
H04L 29/06    (2006.01)

(52) U.S. Cl.
USPC ........................................................ 713/194

(58) Field of Classification Search
USPC ........................................................ 713/194
See application file for complete search history.

(56) References Cited

U.S. PATENT DOCUMENTS

| | | | |
|---|---|---|---|
| 4,535,355 A | 8/1985 | Arn et al. | |
| 4,694,489 A | 9/1987 | Frederiksen | |
| 5,067,035 A | 11/1991 | Kudelski et al. | |
| 5,134,656 A | 7/1992 | Kudelski | |
| 5,144,663 A | 9/1992 | Kudelski et al. | |
| 5,339,413 A | 8/1994 | Koval et al. | |
| 5,375,168 A | 12/1994 | Kudelski | |

(Continued)

FOREIGN PATENT DOCUMENTS

| | | |
|---|---|---|
| EP | 658054 B1 | 6/1995 |
| EP | 714204 B1 | 5/1996 |

(Continued)

OTHER PUBLICATIONS

Wu, Tsung-Li et al., Selective Encryption and Watermarking of MPEG Video (Extended Abstract), Feb. 17, 1997, International Conference on Image Science, Systems, and Technology, 10 pgs.

(Continued)

Primary Examiner — Bradley Holder
(74) Attorney, Agent, or Firm — Frommer Lawrence & Haug LLP; John W. Branch

(57) ABSTRACT

A system, apparatus, and method are directed to providing digital copy protection of media using a subscriber/publisher architecture. In one embodiment, a publisher employs various dynamic and/or static tamper detection, including, filter graph change detectors, ICE detectors, screen scraping detectors, debugger detectors, pattern recognizers, or the like. When a tampering event is detected by one or more of the publishers, the tamper event may be published for access by a subscriber. Published tamper events may be pushed to or pulled by the subscribers. When one or more subscribers receive the tamper event, the subscriber(s) may perform one or more tamper response actions according to various business rules, and/or other core rules.

20 Claims, 8 Drawing Sheets

(56) References Cited

U.S. PATENT DOCUMENTS

| | | |
|---|---|---|
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,613,002 A | 3/1997 | Kephart et al. |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,825,879 A | 10/1998 | Davis |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,937,159 A | 8/1999 | Meyers et al. |
| 5,939,975 A | 8/1999 | Tsuria et al. |
| 5,943,422 A | 8/1999 | Van Wie et al. |
| 5,949,876 A | 9/1999 | Ginter et al. |
| 5,953,005 A | 9/1999 | Liu |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,119,165 A | 9/2000 | Li et al. |
| 6,138,119 A | 10/2000 | Hall et al. |
| 6,151,643 A | 11/2000 | Cheng et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,192,354 B1 | 2/2001 | Bigus et al. |
| 6,201,948 B1 | 3/2001 | Cook et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelmann et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,321,338 B1 * | 11/2001 | Porras et al. ............ 726/25 |
| 6,327,652 B1 | 12/2001 | England et al. |
| 6,330,588 B1 | 12/2001 | Freeman |
| 6,334,213 B1 | 12/2001 | Li |
| 6,363,488 B1 | 3/2002 | Ginter et al. |
| 6,385,596 B1 * | 5/2002 | Wiser et al. ............ 705/51 |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,438,692 B2 | 8/2002 | Kato et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,516,357 B1 | 2/2003 | Hamann et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelmann |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,671,812 B1 | 12/2003 | Balasubramaniam et al. |
| 6,729,549 B2 | 5/2004 | Hamann et al. |
| 6,910,064 B1 * | 6/2005 | Astarabadi et al. ............ 709/203 |
| 6,941,285 B2 | 9/2005 | Sarcanin |
| 7,085,931 B1 | 8/2006 | Smith et al. |
| 7,218,643 B1 * | 5/2007 | Saito et al. .................... 370/466 |
| 7,240,196 B2 | 7/2007 | Cooper et al. |
| 2001/0008015 A1 | 7/2001 | Vu et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0087883 A1 | 7/2002 | Wohlgemuth et al. |
| 2002/0089410 A1 | 7/2002 | Janiak et al. |
| 2002/0099948 A1 * | 7/2002 | Kocher et al. ................ 713/194 |
| 2002/0104004 A1 | 8/2002 | Couillard |
| 2002/0108037 A1 | 8/2002 | Baker |
| 2002/0141582 A1 | 10/2002 | Kocher et al. |
| 2002/0147923 A1 | 10/2002 | Dotan |
| 2003/0007568 A1 | 1/2003 | Hamery et al. |
| 2003/0149887 A1 * | 8/2003 | Yadav ............ 713/200 |
| 2004/0064712 A1 | 4/2004 | Arthur et al. |
| 2004/0078575 A1 | 4/2004 | Morten et al. |
| 2004/0117500 A1 | 6/2004 | Lindholm et al. |
| 2004/0133793 A1 * | 7/2004 | Ginter et al. .................. 713/193 |
| 2004/0151315 A1 | 8/2004 | Kim |
| 2004/0190717 A1 * | 9/2004 | Ueda et al. ..................... 380/213 |
| 2005/0086501 A1 * | 4/2005 | Woo et al. ..................... 713/189 |
| 2005/0257266 A1 | 11/2005 | Cook et al. |
| 2006/0075225 A1 * | 4/2006 | Flynn et al. ................... 713/165 |
| 2006/0190403 A1 * | 8/2006 | Lin et al. ........................ 705/51 |
| 2006/0239501 A1 * | 10/2006 | Petrovic et al. ............... 382/100 |
| 2010/0037051 A1 | 2/2010 | Chang et al. |
| 2010/0274730 A1 | 10/2010 | Wang et al. |
| 2010/0275270 A1 | 10/2010 | Wang et al. |

FOREIGN PATENT DOCUMENTS

| | | |
|---|---|---|
| EP | 0 852 445 A2 | 7/1998 |
| EP | 0886409 A2 | 12/1998 |
| EP | 1041823 A2 | 10/2000 |
| EP | 182875 A2 | 2/2002 |
| JP | 2001-144802 | 5/2001 |
| JP | 2002-084339 | 3/2002 |
| JP | 2004-048772 | 2/2004 |
| WO | WO-96/06504 A1 | 2/1996 |
| WO | WO-96/32702 A1 | 10/1996 |
| WO | WO-99/21364 | 4/1999 |
| WO | WO-99/28842 | 6/1999 |
| WO | WO-99/30499 A1 | 6/1999 |
| WO | WO-99/54453 A1 | 10/1999 |
| WO | 0043856 A1 | 7/2000 |
| WO | WO-01/35571 A1 | 5/2001 |
| WO | WO-01/93212 A2 | 12/2001 |
| WO | WO-02/21761 A2 | 3/2002 |
| WO | WO-02/084980 | 10/2002 |

(56) References Cited

FOREIGN PATENT DOCUMENTS

| WO | 02/91146 A2 | 11/2002 |
|---|---|---|
| WO | WO-03/092264 | 11/2003 |
| WO | WO-2004/002112 A1 | 12/2003 |

OTHER PUBLICATIONS

U.S. Appl. No. 11/150,357 Non-Final Office Action, mailed Nov. 13, 2008, 9 pages.
U.S. Appl. No. 10/020,524 Non-Final Office Action, mailed Sep. 27, 2005, 21 pages.
U.S. Appl. No. 10/020,524 Final Rejection, mailed Apr. 3, 2006, 25 pages.
U.S. Appl. No. 10/020,524 Advisory Action, mailed Jun. 20, 2006, 4 pages.
U.S. Appl. No. 10/020,524 Notice of Allowance, mailed Sep. 1, 2006, 8 pages.
U.S. Appl. No. 10/957,081 Non-Final Office Action, mailed Apr. 18, 2007, 15 pages.
U.S. Appl. No. 10/957,081 Notice of Allowance, mailed Sep. 25, 2007, 8 pages.
U.S. Appl. No. 10/668,046 Non-Final Office Action, mailed Feb. 25, 2009, 12 pages.
U.S. Appl. No. 10/668,046 Notice of Allowance, mailed Jun. 17, 2009, 7 pages.
Friedman, M. et al., "Introduction to Pattern Recognition: Statistical, Structural, Neural and Fuzzy Logic Approaches," World Scientific Publishing Co., 1999, 3 pages.
Ghosh, A. K. et al., "Execution Control Lists: An Approach to Defending Against New and Unknown Malicious Software," Citigal, 2000, 4 pages, <http://www.citigal.com/papers/download/ISW00.pdf>.
Kephart, J. O. et al., "Directed-Graph Epidemiological Models of Computer Viruses," IEEE Computer Society Symposium on Research in Security and Privacy, May 20-22, 1991, 43 pages, <http://www.research.ibm.com/antivirus/SciPapers/Kephart/VIRIEEE/virieee.gopher.html>.
Kephart, J. O. et al., "Computers and Epidemiology," IEEE Spectrum, May 1993, 15 pages.
Kephart, J. O. et al., "A Biologically Inspired Immune System for Computers," Artificial Life IV, MIT Press, 1994, 10 pages.
Forrest, S. et al., "Self-Nonself Discrimination in a Computer," IEEE Symposium on Research in Security and Privacy, 1994, 11 pages.
D'Haeseleer, P. et al., "An Immunological Approach to Change Detection: Algorithms, Analysis and Implications," IEEE Symposium on Security and Privacy, 1996, 10 pages.
Forrest, S. et al., "A Sense of Self for Unix Processes," 1996 Symposium on Security and Privacy, Los Alamitos, CA, IEEE Computer Society Press, 9 pages.
Hofmeyr, S. A., et al., "Lightweight Intrusion Detection for Networked Operating Systems," Dept. of Computer Science University of New Mexico, 1997, 31 pages.
Somayaji, A. et al., "Principles of a Computer Immune System," New Security Paradigms Workshop, Langdale, Cumbria, UK, 1997, 8 pages.
D'Haeseleer, P. et al., "A Distributed Approach to Anomaly Detection," Draft, Aug. 30, 1997, 30 pages.
Kephart, J. O. et al., "Blueprint for a Computer Immune System," Virus Bulletin International Conference in San Francisco, Oct. 1-3, 1997, 19 pages.
Hofmeyr, S. A. et al., "Architecture for an Artificial Immune System," Evolutionary Computation 7(1): 45-68, Massachusetts Institute of Technology, 1999, 31 pages.
Hofmeyr, S. A. et al., "Immunity by Design: An Artificial Immune System," Proceedings of the Genetic and Evolutionary Computation Conference (GECCO), Morgan-Kaufmann, San Francisco, CA, 1999, 8 pages.
Dasgupta, D. et al., "A new Approach for Intrusion Detection," Intelligent Security Systems Research lab Division of computer Science, The University of Memphis, 2001, 12 pages.
Warrender, C. et al., "Detecting Intrusions Using System Calls: Alternative Data Models," Security and Privacy, Proceedings of the 1999 IEEE Symposium, May 9-12, 1999, 13 pages.
Hofmeyr, S. A. et al., "Intrusion detection using sequences of system calls," Journal of Computer Security, vol. 6, Issue 3, 1998, 30 pages.
European Search Report for European Patent Application No. 06846442.9.-2212 mailed Jan. 4, 2012.
Search Report for Taiwanese Patent Application No. 95144669 dated Mar. 16, 2011.
"Establishing Interconnectivity among Various Makers' Products through Standardizatin of VOD Protocol", NTT Corporation Press Release, Sep. 27, 2002. http://www.ntt.co.jp/news/news02e/0209/020927.html.
Balthrop, Justin, et al., "Coverage and Generalization in an Artificial Immune System", Proceedings of Genetic and Evolutionary Computation Conference (GECCO), pp. 1-8, 2002.
Griwodz, Carsten, "Video Protection by Partial Content Corruption", Multimedia and Security Workshop at ACM Multimedia, Bristol, UK, pp. 1-5, Sep. 1998.
Eskiciouglu, A. and Delp, E., "An overview of multimedia content protection in consumer electronics devices", SP:IC, 16(7): pp. 681-699, Apr. 2001.
Spanos, George, et al., "Performance Study of a Selective Encryption Scheme for the Security of Networked, Real-Time Video", Proceedings of the 4th ICCN, Las Vegas, NV, pp. 2-10, Sep. 1995.
Intelligent Systems for Finance and Business, Goonatilake, Suran, ed. et al., Chapters 2-10, pp. 31-173, 1995.
"Irdeto Access & Optibase create Strategic Alliance", Press Release, Optibase, pp. 1-4, Dec. 14, 2000. http://www.irdetoaccess.com/press/0000041.htm.
Blumenfeld, Steven, "System Security, Streaming Media", Broadcast Engineering magazine, pp. 1-2, Oct. 2001.
Forrest, S., "Research Projects", pp. 1-3, Dec. 2, 2003. http://www.cs.unm.edu~forrest/projects.html.
Cheng, H.C.H., "Partial Encryption for Image and Video Communication", Department of Computing Science, University of Alberta, pp. 1-87, Fall, 1998.
Hunter, J., et al., "A Review of Video Streaming Over the Internet", DSTC Technical Report TR97-10, pp. 1-28., Aug. 1997.
Schulzrinne, H., et al., Real Time Streaming Protocol (RTSP), RFC 2326, pp. 1-86, Apr. 1998.
"Irdeto Access & Optibase create Strategic Alliance", Press Release, Optibase, pp. 1-2, Dec. 14, 2000. http://www.optibase.com/html/news/December_14_2000.html.
Omneon Video Networks Product Announcement, "Broadband Streaming Omneon and BSkyB", TB-1006-1, pp. 1-4.
Yoshida, Kazuhiro, et al., "A Continuous-media Communication Method for Minimizing Playback Interruptions", IS&T/SPIE Conference on Visual Communications and Image Processing, , SPIE, vol. 3653, pp. 748-757, Jan. 1999.
Hanushevsky, A. and Cowles, R., "Virtual Smart Card", Stanford Linear Accelerator Center, pp. 1-12, Dec. 13, 2002.
Baker, Brian, et al., "Taking a Different path—The application of virtual smart card technology to interactive TV", Communications Engineering & Design, pp. 1-5, Aug. 3, 2003. http://testced.cahners1.com/ced/2003/0803/08b.htm.
Griwodz, Carsten et al., "Protecting VoD the Easier Way", ACM Multimedia, 1998, Bristol, UK, pp. 21-28.
Schulzrinne, H., et al., "TRP: A Transport Protocol for Real-Time Applications", RFC 1889, pp. 1-75, Jan. 1996.
European Patent Office, Communication dated Jan. 26, 2006 for EP Application No. 05250968.4.
Communication pursuant to Article 96(2) EPC dated Dec. 6, 2006 corresponding to EP Application No. 00986215.2 filed Nov. 9, 2000.
English Translation of Japanese Office Action, "Reason for Rejection", for corresponding Japanese Application No. 2004-328028.
International Search Report dated Oct. 12, 2005.
International Search Report dated May 24, 2007.
Office Action issued in Canadian Patent Application No. 2,631,690 on Jul. 15, 2013.

* cited by examiner

TAMPER PREVENTION AND DETECTION FOR VIDEO PROVIDED OVER A NETWORK TO A CLIENT

CROSS-REFERENCE TO RELATED APPLICATIONS

The present application claims priority from provisional application Ser. No. 60/741,758 that is entitled "Tamper Prevention and Detection For Video Provided over a Network To a Client," and filed on Dec. 2, 2005, the benefit of the earlier filing date of which is hereby claimed under 35 U.S.C. §119 (e), and further incorporated by reference.

BACKGROUND OF THE INVENTION

The invention relates generally to computing security, and more particularly but not exclusively to protecting media 'in the clear' during a 'digital hole' from static and/or dynamic security attacks using a publisher/subscriber architecture.

Broadcast television is a multi-billion dollar global market served by cable, satellite, and increasingly telecommunications companies. Broadcast television allows users to view content by tuning their television to scheduled programs or events. There is little personalization allowed. Enhanced and iTV allows far greater personalization of the TV viewing experience. Historically the security needs of the broadcast market were fulfilled by conditional access system (CAS) and more recently digital rights management (DRM) technologies.

Over the last several years, cable operators, content owners, and consumer electronics companies have been innovating with the hope to expand the distribution of entertainment beyond the set top box found in millions of homes. In the cable industry today there is a major focus on developing products to allow the expansion of the authorized video service domain to encompass multiple devices throughout the home.

Consumer electronic companies continue to innovate rapidly taking advantage of internet protocols used in home networks to move entertainment content.

Concerns over protection of the operator's revenue streams and intellectual property rights of the content owner have slowed progress towards these goals. So much so, that numerous "digital" home security initiatives have been born. Many of these initiatives involve bridging from one link level security control to another or perhaps to a proprietary digital rights management scheme. Many of these initiatives rely on the assumption of trust between the devices and manufacturers. In a world of rapid change leading to a large amount of confusion and questions around the actual content security achieved resulting in an unrealized vision.

At the same time content delivery to the authorized service domain (such as the home) has been steadily moving to a video distribution network that is largely dependent on IP based infrastructure. Video over DSL or Fiber is described as the delivery of quality MPEG video services and "on-demand" content to either an access network or to the consumer premise using a Fiber or copper infrastructure. This infrastructure often uses the same physical and transport protocols that are common to a computer network similar to what is found in the home or a typical business enterprise.

Internet Protocol TeleVision (IPTV) has matured from small Telco trials since approximately the 2001 time frame into a viable and growing market with large scale deployments today. Early stage projects were often conducted without basic security mechanisms due to the size of the trials and the belief that addressability was security enough. However, recently content owners (broadcasters and studios) began enforcing the same security requirements that have been required in the MSO for years. This renewed focus on IPTV security has led to innovations that may be tapped in order to expand the authorized service domain for video into any domain readily available to the telecommunications industry (the home, the office and the mobile consumer, wherever they may roam). This includes expansion beyond the Set Top Box (STB) to personal computers, portable players, mobile phones, audio/video systems in cars and into other consumer electronic devices.

In order for this expanded domain to be successful, the media is expected to be secure no matter how or where it may travel; moreover, it may be desirable to have available various payment models for the media. Therefore, it is with respect to these considerations, and others, that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
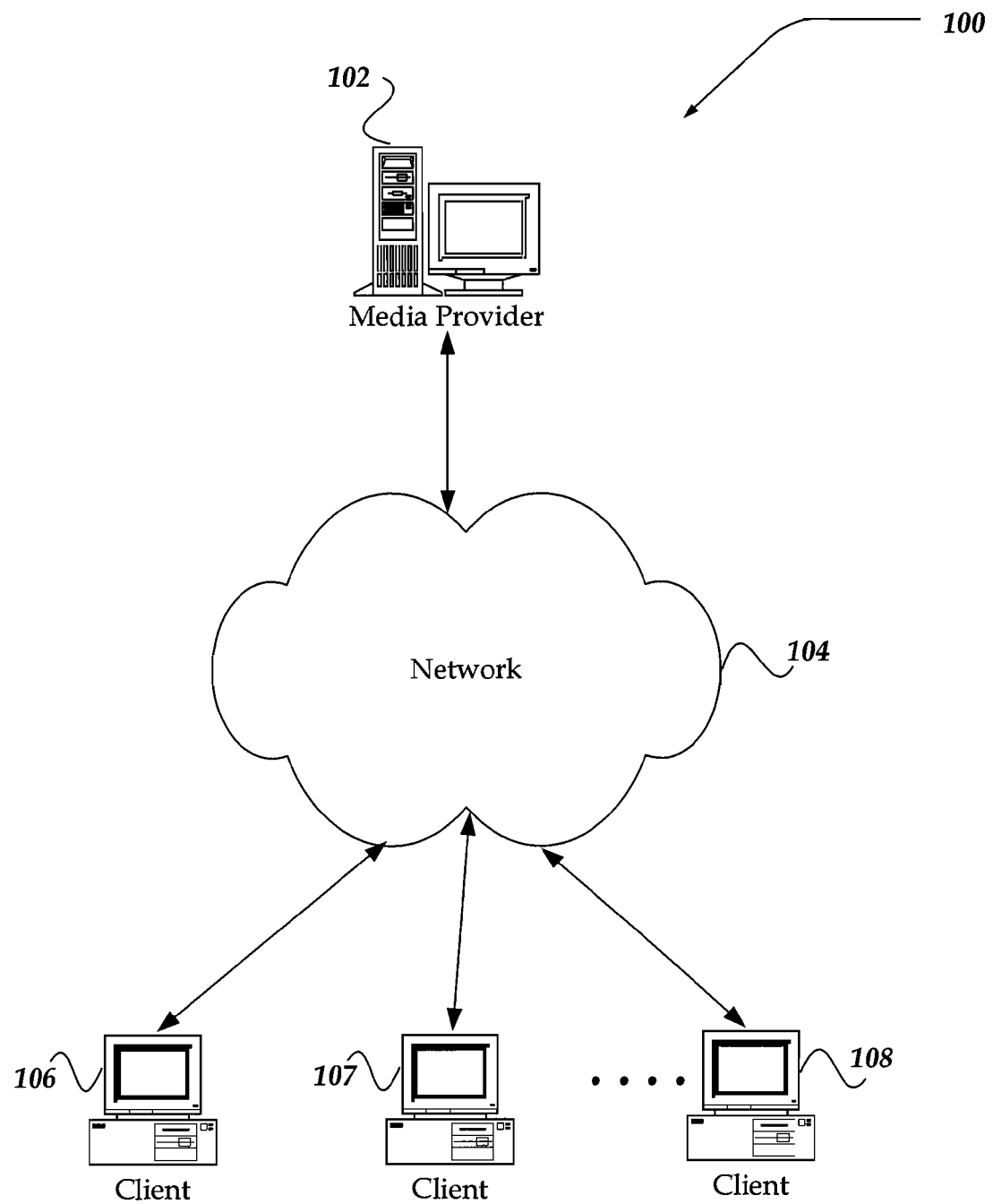
FIG. 1 shows a functional block diagram illustrating one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Nor does the phrase "in another embodiment" necessarily refer to a different embodiment, although it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Moreover, AES refers to Advanced Encryption Standard. Authentication refers to proving a component, device, person, or other entity is who/what they claim to be. Authentication is often treated as synonymous with identity. Authentication answers the question: Is this really Brian?

Authorization (Access Control) refers to answering the question of what operations an entity is entitled to perform. Authorization answers the question: Does Brian (a fictional valid user) have permission to access that data?

CAS or Conditional Access System, or simply Conditional Access (CA) includes technologies used to control access to digital television services, or the like, to authorized users by encrypting the transmitted programming. A CA system provider may supply the equipment and software to the broadcaster who then integrates the CA system into his equipment. CA may not be designed solely for TV. It can be used for digital radio broadcasts, digital data broadcasts and non-broadcast information and interactive services.

VSC (Virtual Smart Card)—the client side a component of the invention responsible for entitlement management message processing, fingerprinting, and decryption.

DRM—Digital Rights Management is an alternative method for protecting media from theft. CAS is targeted at allowing or denying access to media streaming from an operator's service. A DRM system on the other hand, protects the content itself so that mere access to the content does not make the content viewable or usable. A DRM system normally provides content protection by encrypting the content. Once encrypted the content can then be distributed at will. A license file is issued to enable the user to play the content (either together with the content or when a user tries to play the clip). The content is encrypted only once and the encryption properties persist as the content travels between networks and on storage devices.

ECM or Entitlement Control Messages are encrypted data that contains access constraints and content keys. EMM or Entitlement Management Messages are encrypted data that contains entitlements and content keys.

A fingerprint uniquely identifies a client or server computer in the context of a system. A Fingerprint is made up of a number of elements specific to each fingerprint. These are hereafter called Ridges. Each Ridge is an element of a fingerprint that provides information to the fingerprint making it unique from other fingerprints. Some examples of Ridges are hardware serial numbers, operating system version numbers, internet protocol address, and physical memory size. Each Ridge added to a Fingerprint refines the identity of the system until it can be uniquely identified within a system. The combinations of the Fingerprints create the Handprint or System Fingerprint that uniquely identifies the personal computer, server, set top box or device within the system. The order of each of the fingerprint groups and individual Ridges affects the resulting Fingerprint and Handprint. This feature means that each user of the Fingerprint technology can generate a unique fingerprint and subsequent Handprint even though the core Ridge information being utilized is the same. Fingerprinting is typically done in systems where device identity is inherently weak.

The term "ICE" refers to In-Circuit Emulators. The ICE chip emulator is configured to replace a given CPU with an emulated CPU and to take over control for and emulate the existing processes.

Integrity refers to the process of ensuring that the content of a message or a store has not been changed.

Intrusion Detection includes the process of detecting situations, which violate the security policy and other protections. This involves any number of tamper detection mechanisms. Intrusion Detection identifies situations like: Brian (a fictional valid user) is attempting to perform an unauthorized action.

iTV or Interactive television includes multicast and unicast services like video-on-demand and personal video recorders.

Non-Repudiation—The standard approach to non-repudiation is the use of two distinct keys. One key is escrowed, and is used for non-signing functions. The second key, without a recovery mechanism, is utilized for signing. In such a model, where the user is in sole control of the signing key, non-repudiation is achieved by means of a sole owned yet verifiable secret. In cases where signing validity is critical, a separate key will need be issued, and said key will need to be the sole owned yet verifiable secret of the key holder. In any other case, the key holder could refuse the validity of the signature based on the ability of a sufficiently privileged person to replicate the secret key.

Privacy (Confidentiality) involves keeping communication or storage of information secret. This is typically performed using encryption.

Rapid Renewal refers to a renewal performed in hours as opposed to months. Renewal refers to a process of providing key generation and provisioning new keys or new security mechanisms to the consumer premise device.

Secure Message Manager provides a secure medium for message exchange. It interacts with other components as required to ensure that mutual authentication of the end parties is accomplished and privacy of the messages is maintained.

Timeliness refers to a measure of validity of data. Timeliness involves protecting against replay attacks. Is this entitlement a valid entitlement in time or order?

Briefly stated, the invention is directed towards a system, apparatus, and method for providing digital copy protection of media using a subscriber/publisher architecture. In one embodiment, various publishers provide the protection during a digital hole, where a digital hole represents a time between a decryption and rendering of the media such that the media is 'in the clear,' exposed, and/or unencrypted. The protection may be against static as well as dynamic attacks to the media. The publishers may employ any of a wide variety of techniques of dynamic and/or static tamper detection, including, but not limited to ICE detectors, behavior analyzers, filter graph change detectors, screen scraping detectors, debugger detectors, pattern recognizers, trusted time masters, or the like. When a tampering event is detected by one or more of the publishers, the tamper event may be published to a repository. In one embodiment, the tamper event is published as an object in the repository. Various subscribers may subscribe to the repository. In one embodiment, published tamper events may be pushed to the subscribers. In one embodiment, an object manager or mediator may be employed to manage the repository by receiving tamper events, publishing them to the repository, and pushing the tamper event objects out to subscribers. When a subscriber receives the tamper event, the subscriber may perform one or more tamper response actions according to various business rules, and/or other core rules. In one embodiment, the communications between subscribers, publishers, the repository, mediator, or the like, is encrypted, using any of a variety of encryption mechanisms, including but not limited to Advanced Encryption Standard (AES), Data Encryption Standard (DES), or the like. In one embodiment, the communications is over a secure channel using, such as Secure Socket Layer (SSL), Transport Layer Security (TLS), or the like.

In one embodiment, the invention may be deployed as an n-tier distributed self-monitoring system with publishers and subscribers. What this means is that the components are distributed across the enterprise as required and they monitor each other to ensure healthy operational characteristics. That is, in one embodiment, one or more publishers may further monitor one or more other publishers, and or subscribers to ensure that they are not tampered with.

Moreover, the invention is configured to prevent users from purchasing a movie, program, or other media, and recording it for redistribution. In one embodiment, the invention includes a software component that may integrate seamlessly with a VSC client.

The invention provides tamper evidence, intrusion detection and a tamper monitoring capability for open or semi-open client environments. It prevents data packets from being captured by network stack hacking techniques, screen-scraping and VCR like utilities, in-circuit emulators (hardware or software), and other common hacking tools. There are several lines of defense against hack attempts including both active and passive measures to monitor for hacking tools and the behavior characteristics the tools exhibit. Responses to detected hack attempts are based on business rules associated with content or the service and include service interruption, revocation, key renewal, or more aggressive responses.

Features of the invention includes, but are not limited to, providing rule-based copy protection (detection, resistance, and response); providing selectable Client Device digital output control; enabling removable media protection; providing tamper response that can be integrated with hardware tamper detection; enabling protection against debuggers & In-Circuit emulators; providing remote access, digital recorder and screen scraper protection. When combined with an application level persistent encryption, digital output may remain encrypted.

For a conditional access system or a DRM to be considered secure it is expected to have the following characteristics: Privacy (Confidentiality), Integrity, Timeliness, Access Control (Authorization), and Authentication (Identity). Thus one embodiment of the invention is directed towards integrity.

Typically, when a hacker tries to compromise the media provider's intellectual property, he may utilize several different methods to achieve this goal. Regardless of the exploit used, the results of many hacking activities are nearly identical and can be generalized as follows: locating, capturing, and organizing the output files and/or streams so that can be posted on the Internet and/or a P2P network at any time.

A common way that the hacker uses to hack a Client Device is from the inside. In this case, they may use special tools similar to the screen scrapers or stream scrapers (stream recorders) that they have installed on the PC or STB. Another common way is hacking the computer or the CPU from the outside by using special tools such as VNC or PC Anywhere. Yet another common way is to hack the computer or the CPU by using special tools similar to the Terminal Services. Moreover, still another way is to obtain access to the software and/or hardware that controls digital media and making the necessary changes.

In spite of the available exploits, it is still possible to find a practical, single non-hardware solution based on the static and dynamic analysis related to specific system events and outputs that are a direct result of the exploits. The results obtained from such analysis could be used for Digital Copy Protection (DCP).

Thus, the invention may analyze the static and dynamic behaviors of a system and the existing processes on a consumer device. This process of behavior analysis is similar to the principle of so-called Artificial Immune System (AIS). AIS have some similarities in recognition mechanisms to the Human Immune System that can determine number of events happened to the human body as "Self" or "Non-self." The process of behavior analysis has certain similarities to the Authentication System as well. The concept behind the invention supposes that the behavior of a "normal" system and its processes are different from the behavior of an "abnormal" system and its processes. Identifying these differences by the invention, then enables it to perform a proper analysis of the data and take security measures based on business rules.

Illustrative Environment

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes media provider 102, network 104, and clients 106-108. Network 104 is in communication with media provider 102 and clients 106-108.

One embodiment of media provider 102 is described in more detail below in conjunction with FIG. 3. Briefly, however, media provider 102 includes computing devices configured for use by producers, developers, and owners of media that can be distributed to client devices 106-108. Such media, includes, but is not limited to motion pictures, movies, videos, music, PPV, VoD, interactive media, audios, still images, text, graphics, and other forms of digital media directed towards a user of a Client Device, such as Client Devices 106-108. Media provider 102 may also include businesses, systems, and the like that obtain rights from a media owner to copy and distribute the media. Media provider 102 may obtain the rights to copy and distribute from one or more media owners. Media provider 102 may repackage, store, and schedule media for subsequent sale, distribution, and license to other media providers, users of client devices 106-108, and the like.

Media provider 102 may also be configured to provide at least a portion of copy protection functionality using publishers, subscribers, or the like. For example, in one embodiment, media provider 102 may provide to client devices 106-108 a publisher component configured to monitor for various tampering actions on the client device. In one embodiment media provider 102 may also provide one or more subscribers to client devices 106-108 for use in consuming tamper events that may be generated by one or more of the publishers. The subscriber provided may then apply various business rules to determine an appropriate action, including sending a message, terminating access to media, or the like. Moreover, in one embodiment, media provider 102, or another server (not shown) may also provide VSC software.

Although illustrated as employing network 104 to communicate media to client devices 106-108, the invention is not so limited. For example media provider 102 may employ virtually any mechanism to communicate media, including, but not limited to a data communications line, virtually any storage device, including a CD, a DVD, floppy diskette, magnetic tape, and the like. The media may be encrypted using any of a variety of encryption techniques. Similarly, the media may also be unencrypted.

Devices that may operate as media provider 102 include personal computers desktop computers, multiprocessor systems, microprocessor-based or programmable consumer electronics, network PCs, servers, and the like.

Network 104 is configured to couple one computing device to another computing device to enable them to communicate. Network 104 is enabled to employ any form of computer readable media for communicating information from one electronic device to another. Also, network 104 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between Client Devices 106-108 and media provider 102.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Client Devices 106-108 may include virtually any computing device capable of receiving media over a network, such as network 104, from another computing device, such as media provider 102. Client Devices 106-108 may also include any device capable of receiving the media employing other mechanisms, including, but not limited to CDs, DVDs, tape, electronic memory devices, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Client Devices 106-108 may also be any device that is capable of connecting using a wired or wireless communication medium such as a Personal Digital Assistant (PDA), POCKET PC, wearable computer, and any other device that is equipped to communicate over a wired and/or wireless communication medium to receive and play content. Similarly, Client Devices 106-108 may employ any of a variety of devices to enjoy such content, including, but not limited to, a computer display system, an audio system, a jukebox, set top box (STB), a television, video display device, IPTV, or the like. Client Devices 106-108 may be implemented employing a client device such as described in more detail below, in conjunction with FIG. 2.

Client Devices 106-108 may include a client that is configured to enable an end-user to receive media and to play the received content. The client may also provide other actions, including, but not limited to, enabling other components of the client device to execute, enable an interface with another component, device, the end-user, and the like.

Client Devices 106-108 may further receive a publisher component, or the like, that is configured to monitor a characteristic of a behavior of the client device, and when a behavior is determined to be an abnormal (bad or unauthorized) behavior, the publisher component may enable an action such as through a subscriber component, or the like, to protect the media from a potentially unauthorized action. Such actions may include any of a variety of predetermined actions based on a policy, a rule, or the like, including turning off a network connection, turning off one or more processes, destroying or otherwise inhibiting access to content, providing a message to an end-user of the computing device, an owner of the content, or the like.

Moreover, Client Devices 106-108 may also receive other publisher and/or subscriber components useable to monitor components within client devices 106-108 and detect evidence of tampering actions. When such evidence is detected the publisher components may publish information associated with the detected events. In one embodiment, the published information is encrypted using such as AES, DES, or any of a variety of other encryption mechanisms.

In one embodiment, in system 100 an operator may remain responsible for authorizing consumption of the media throughout an authorized service domain, such as described in FIG. 1. This is possible beyond the traditional walls of the home because of the reach of operators today via land lines, mobile phones, wireless, wired internet or disconnected mediums, or the like. This enables at least some of the actions performed by the subscribers to be performed at a server, such as server 102. Moreover, in system 100 the consumer may be an authorized subscriber of services from the operator, even where one of the services is the delivery of IPTV not only to the home, but beyond.

Illustrative Client Device

Figure 2:
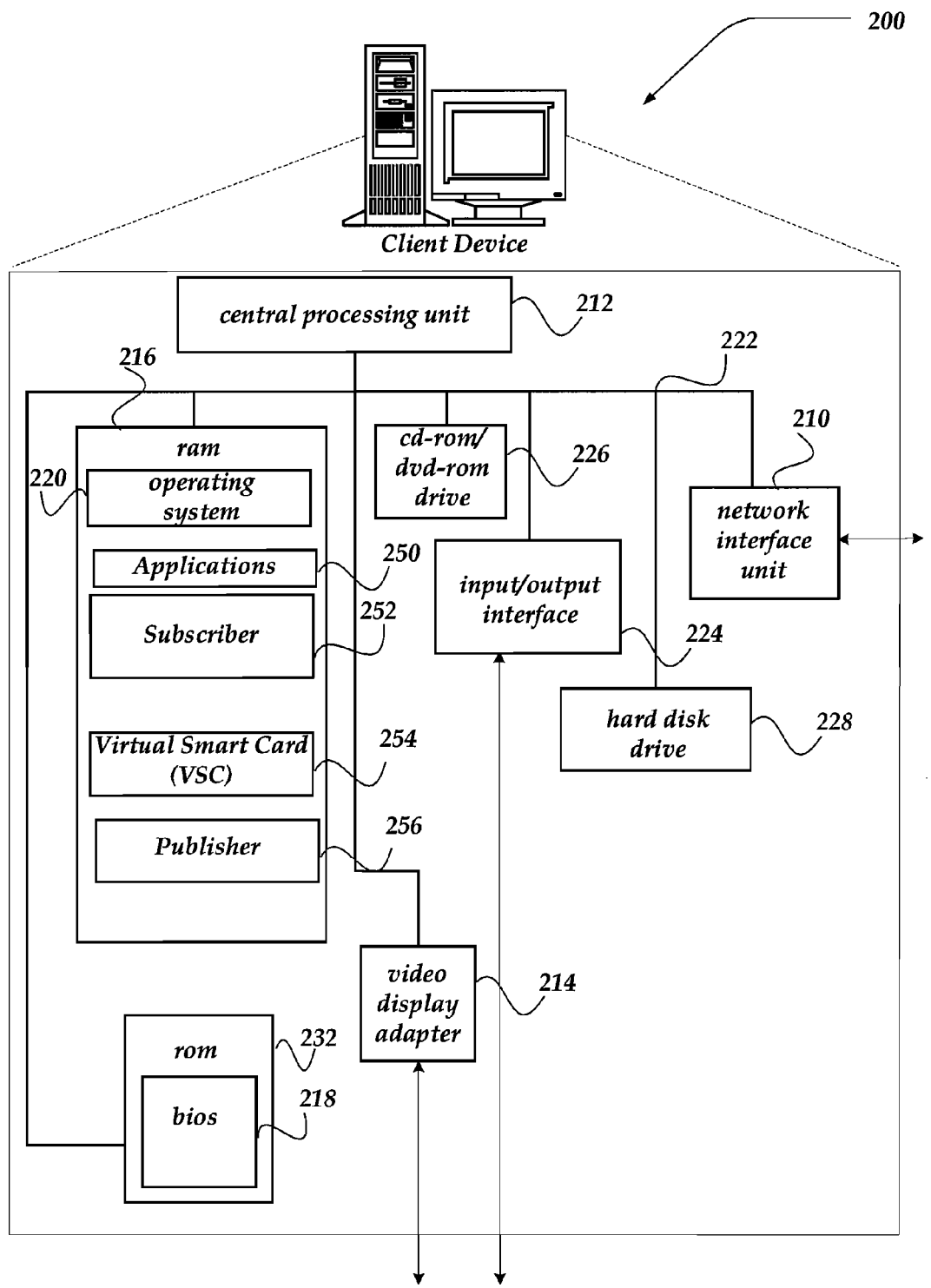
FIG. 2 shows one embodiment of a client device that may be included in a system implementing the invention.

FIG. 2 shows one embodiment of a computing device, according to one embodiment of the invention. Client Device 200 may include many more components than those shown. The components shown, however, are sufficient to disclose an illustrative embodiment for practicing the invention. Client Device 200 may represent, for example, Client Devices 106-108 of FIG. 1.

Client Device 200 includes processing unit 212, video display adapter 214, and a mass memory, each in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of Client Device 200. Any general-purpose operating system may be employed. Basic input/output system ("BIOS") 218 is also provided for controlling the low-level operation of client device 200. As illustrated in FIG. 2, Client Device 200 also can communicate with the Internet, or some other communications network, such as network 104 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Client Device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Client Device 200 may also includes input/output interface 224 for communicating with external devices, such as a handheld remote control device, mouse, keyboard, scanner, or other input devices not shown in FIG. 2. Likewise, client device 200 may further include additional mass storage facilities such as CD-ROM/DVD-ROM drive 226 and hard disk drive 228. Hard disk drive 228 may be utilized to store, among other things, application programs, databases, client device configuration information, policy, and the like.

The mass memory also stores program code and data. One or more applications 250 are loaded into mass memory and run on operating system 220. Examples of application programs may include, but is not limited to transcoders, schedulers, calendars, database programs, word processing programs, HTTP programs, audio players, video players, VoD players, decoders, decrypters, PPV players, interface programs to an STB, interface programs to a television, video camera, and so forth. Mass storage may further include applications such as VSC 254, publisher 256, and subscriber 252, each of which may be downloaded from another computing device, such as server 102 of FIG. 1. Although only a single publisher and subscriber are illustrated, the invention is not so limited and more or less publishers and/or subscribers may also be employed.

VSC 254 includes computer-executable code static data, and the like, that is configured to enable content protection similar to physical smart card approaches. However, unlike the physical smart card approaches, VSC 254 is configured as software that may be downloaded to enable changes in security solutions to be implemented rapidly (in seconds, minutes, or hours) at relatively low costs. This is in stark contrast to physical smart card approaches that often require new hardware to be generated and distributed. Such physical approaches typically are made available as updates about once or twice a year.

Typical VSC 254 software may include various components including, secure stores, fingerprinting modules, secure message managers, entitlement manages, key generators, digital copy protection engines, and the like. VSC 254, and its components, may be configured to enable protection of received content. In one embodiment, VSC 254 may be configured, in part, to employ the results of a publisher, to generate a decryption key for use in decrypting received content. In another embodiment, VSC 254 may receive the decryption key from another device, or component, such as subscriber 252.

Figure 4:
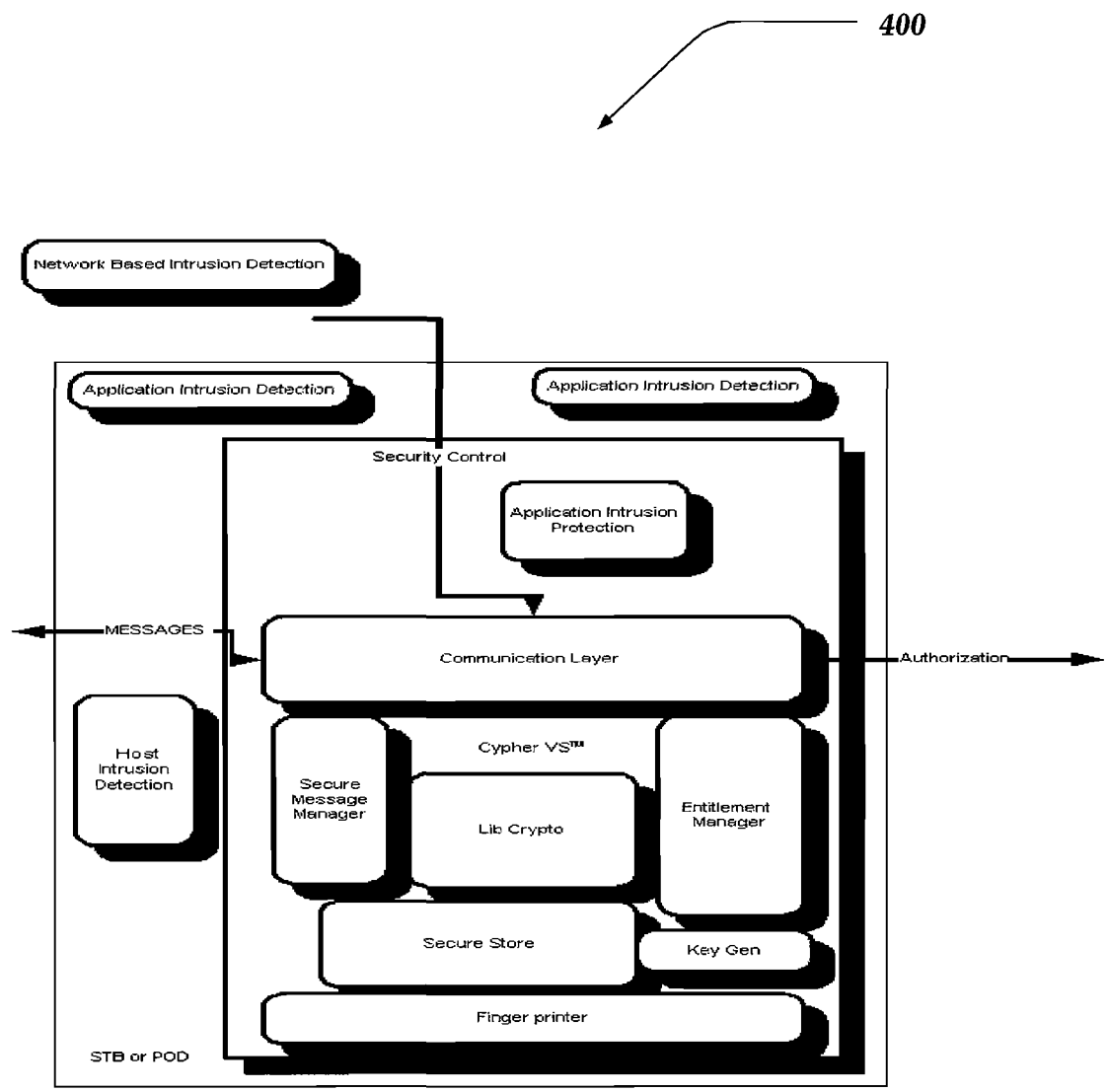
FIG. 4 shows one embodiment of a virtual smart card.

VSC 254 and its components may be represented by a sequence of binary data residing in mass memory. In one embodiment, the sequence of binary data representing VSC 254 includes the software to be evaluated. However, the invention is not so limited, and virtually any software may be evaluated. One example embodiment of VSC 254 is shown in FIG. 4. Moreover, one or more publishers and/or subscribers may also reside within VSC 254.

Publisher 256 may include a mix of platform specific tamper monitor components and tamper rule engines that look for evidence of tampering actions. Such actions include, but are not limited to modifying code, such as an application, screen scraping, or similar types of hacking, whether the hacking is static and/or dynamic in nature. Examples of publishers 256 are described further below. The publisher 256's components directly leverage the functionality of tamper detection hardware as well as applying software tamper detection, and/or other tamper evidence rules to the executing context. If evidence of tampering is detected by one of more publisher 256s, publisher 256 securely "publishes" tamper events. In one embodiment, publisher 256 may publish the tamper events as objects to a repository. In one embodiment, the repository may reside on a server, such as server 102 of FIG. 1. In one embodiment, one or more publisher 256s may reside within a client device such as client devices 106-108 of FIG. 1, and/or a server device such as server 102 of FIG. 1.

Subscriber 252 registers to "consume" the tamper events generated by one or more of the publisher 256s. The subscriber clients then apply specific business rules to the events they receive. These types of rules range from simply logging events to initiating defensive action. In one embodiment, one or more subscriber 252s may reside within a client device such as client devices 106-108 of FIG. 1, and/or a server device such as server 102 of FIG. 1.

Illustrative Server Device

Figure 3:
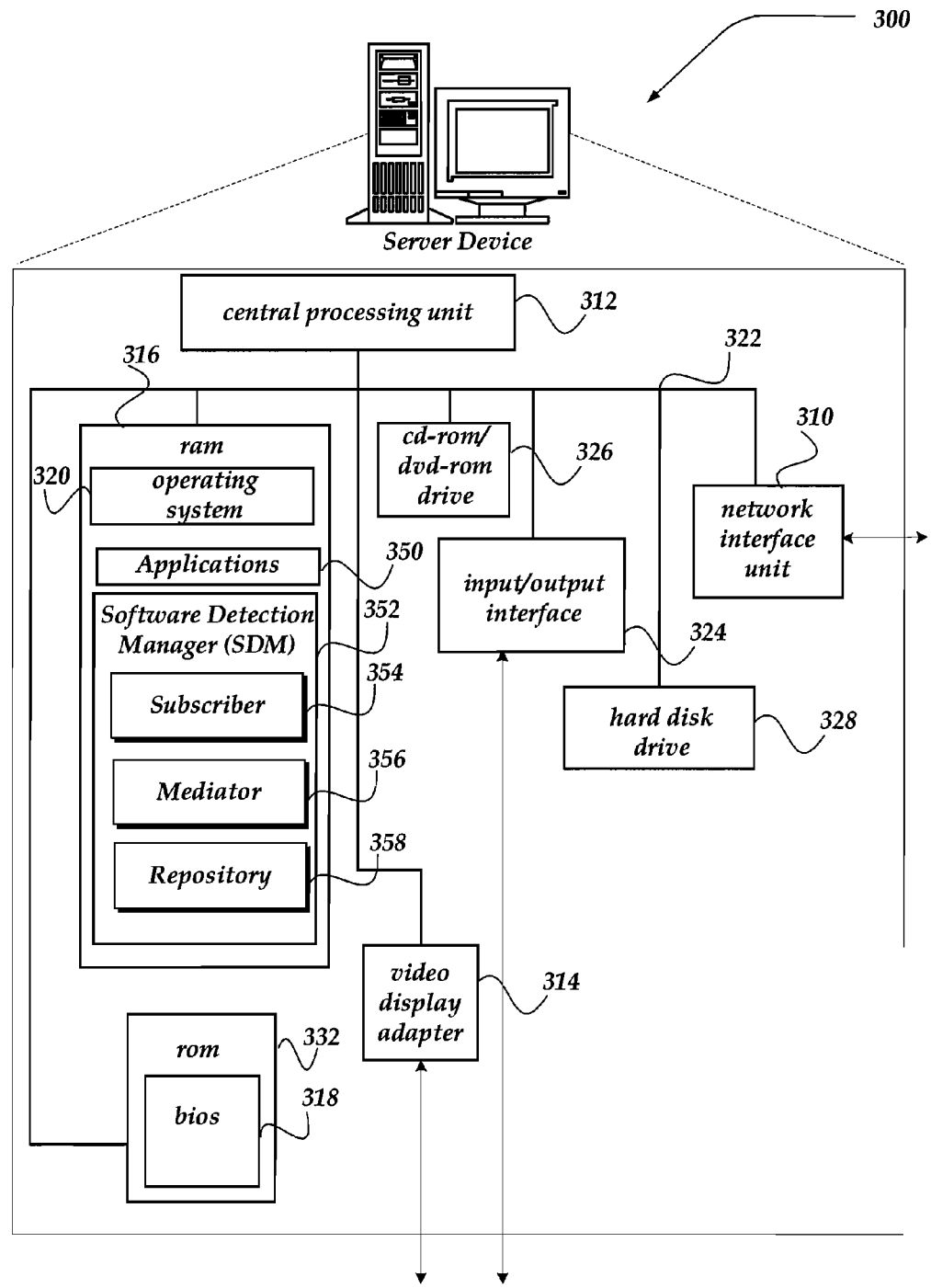
FIG. 3 shows one embodiment of a server device that may be included in a system implementing the invention.

FIG. 3 shows one embodiment of a computing device, according to one embodiment of the invention. Server device 300 may include many more or less components than those shown. The components shown, however, are sufficient to disclose an illustrative embodiment for practicing the invention. Server device 300 may represent, for example, server 102 of FIG. 1.

Server device 300 includes processing unit 312, a mass memory, and may include a video display adapter 314, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 318 is also provided for controlling the low-level operation of server device 300. As illustrated in FIG. 3, server device 300 also can communicate with the Internet, or some other communications network, such as network 104 in FIG. 1, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Server device 300 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Server device 300 also may include input/output interface 324 for communicating with external devices, such as a mouse, keyboard, scanner, or other input devices not shown in FIG. 3. Likewise, server device 300 may further include additional mass storage facilities such as CD-ROM/DVD-ROM drive 326 and hard disk drive 328. Hard disk drive 328 may be utilized to store, among other things, application programs, databases, client device configuration information, policy, and the like.

The mass memory also stores program code and data. One or more applications 350 are loaded into mass memory and run on operating system 320. Examples of application programs may include, but is not limited to transcoders, HTTP programs, and so forth. Mass storage may further include applications such as software detection manager (SDM) 352. SDM 352 represents one embodiment of a publisher component. Moreover, although not illustrated, server device 300 may include other publishers, and/or subscribers, without departing from the scope or spirit of the invention.

SDM 352 is configured to enable detection of a tampering at, such as a client device. In one embodiment SDM 352 monitors tampering of various software. Such software may include software for a virtual smart card (VSC), for example. However, the invention is not so limited, and SDM 352 may also monitor for hardware tampering, operating system tampering, screen scraping, attempts to inappropriately obtain media, or the like. SDM 352 may periodically download to a client device a publisher, and/or subscriber for use in detecting tampering and/or responding to tamper events. SDM 352 may also download a publisher and/or subscriber when an initial connection is established with the client device; based on some event, condition; or the like.

In one embodiment, SDM 352 includes subscriber 354 that is configured to receive results from the client device that are based on execution of one or more publishers on the client device. Subscriber 354 however, may also be implemented distinct from SDM 352, rather than being integrated within it.

Subscriber 354 may consume tamper event results that may be generated by one or more publishers, including such as SDM 352, publishers residing on a client device, or the like. In one embodiment, subscriber 354 may receive the tamper events over a network, from, for example, the client device. However, subscriber 354 may also receive the tamper events directly from a publisher, or from accessing a repository, such as repository 358, or the like. In one embodiment, subscriber 354 may also receive tamper events through a push mechanism from a mediator, such as mediator 356. One embodiment of a mediator is described in more detail below in conjunction with FIG. 5. Moreover, subscriber 354 may also employ a pull mechanism to obtain tamper events, or even a combination of push/pull mechanisms, without departing from the scope of the invention.

Subscriber 354 may apply business rules to the events it receives. Then, based, at least in part, on the business rules, subscriber 354 may perform various actions, including, but not limited to, inhibiting sending of media to the client device, sending a message to a media owner regarding the modification, or a variety of other actions.

Selection of which of the above, or other, mechanism for detecting a modification may be based on a variety of criteria, or the like. For example, in one embodiment, where the server device and client device are employing a one-way communication mechanism such that the client device might not be able to send information to the server device, then detection of tampering may be determined at the client device. Where the client device and server device are employing a two-way communication mechanism, then any of the above mechanisms may be employed. However, it is noted that other criteria for selecting the mechanism for detection may be used, without departing from the scope or spirit of the invention.

FIG. 4 shows one embodiment of a virtual smart card that may be included in a system implementing the invention. When the virtual smart card is combined with the tamper detection technology of one embodiment, the virtual smart card becomes a highly secure mechanism. Intrusion detection and protection agents can be applied at various points in a system employing a smart card. Typically some level of protection is provided as part of the software and/or hardware of the smart card. This is application level protection. Additionally application level detection can be hidden within the host set top box or point of deployment device. This protection can include agents that perform: In-circuit emulator detection, debugger detection, debugger resistance, memory space violation detection, and other application level piracy behavior detection. Host intrusion detect agents can also be deployed to identify intrusions from other systems on the host device. In an iTV environment it is possible to deploy intrusion detection within the network to monitor for cloning of virtual smart cards and to provide trusted time preventing replay attacks. Finally in an iTV environment, where transactions are registered in the head end databases for immediate billing, the risk can be significantly diminished.

Some level of tamper resistance, detection, and response mechanisms may be provided by the hardware manufacturer. These hardware tamper mechanisms may allow for supplementation by software tamper protection methods.

Figure 5:
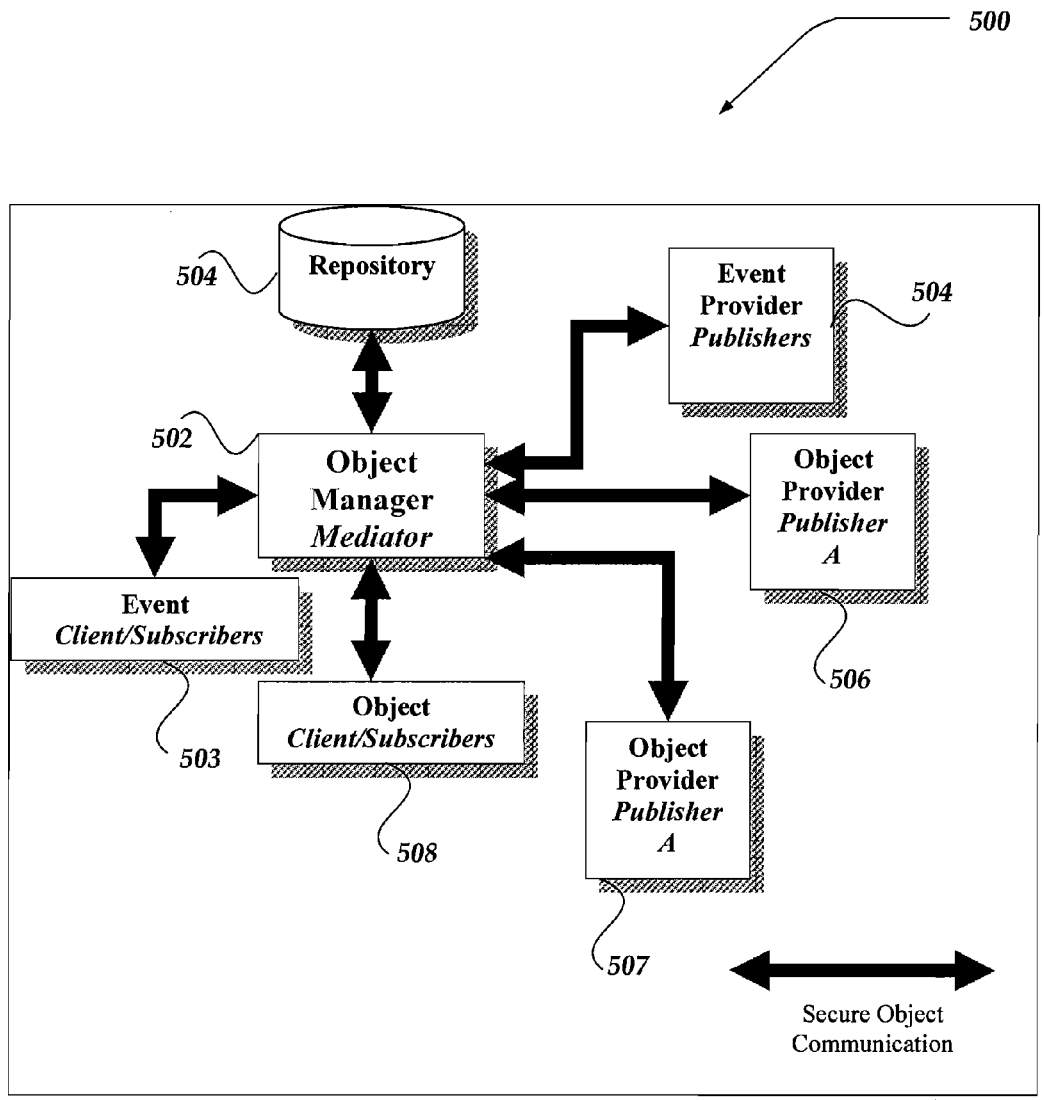
FIG. 5 shows a functional block diagram illustrating one embodiment of a general system overview of the invention.

FIG. 5 shows a functional block diagram illustrating one embodiment of a general system overview using publishers and subscribers. FIG. 5 illustrates how one embodiment may perform its features and functions when used, for example, within a broadcast and iTV environment. For example, it may allow the use of secure content and processes in an un-trusted environment. The common solution is to create a trusted environment like a trusted operating system running on trusted hardware and the subsequent certification and registration of components, which operate in the trusted environment as trusted. If a component is not trusted it is not allowed to operate. This method reduces flexibility and may require control of all the variables in the environment.

As shown, system 500 of FIG. 5 includes subscribers 503 and 508, publishers 504, and 506-507, repository 504, and an object manager (mediator) 502. The subscribers 503 and 508 and publishers 504, and 506-507 may be bound through a data association. The associations between components as well as the components themselves can be changed at run-time through the use of an authenticated and authorized process.

In addition, the repository 504, which may be used to operate storage for logged tamper events, and/or the object manager (mediator) 502, may reside in a client device, and/or a server device. Moreover, a portion of the repository 504 may be distributed across both a client device and a server device, without departing from the scope or spirit of the invention.

Repository 504 may be configured to receive and manage tamper events. In one embodiment, the tamper events may be structured as objects. Object manager (mediator) 502 may receive tamper events from one or more publishers 504, and/ or 506-507, and publish the tamper events to repository 504. Object manager (mediator) 502 may also use a push, and/or pull mechanism to provide the tamper events to one or more subscribers 503 and 508.

Tamper Event Publishers

A variety of publishers may be implemented that can employ one or more of the tamper detection mechanisms, depending on the platform. It should be noted, however, that the following list of tamper detection mechanisms is not intended to be an exhaustive list of possible tamper event publishers, and other tamper detection mechanisms may be employed without departing from the scope of the invention.

ICE Detection: This intrusion detection mechanism monitors the host environment, such as client devices 106-108 of FIG. 1 (or even server 102 of FIG. 1), for behaviors that could indicate the use of an in-circuit emulator. In-circuit emulators may be used to aid in the debugging, or reverse engineering of a system, such as client devices 106-108, processes within client devices 106-108, and/or CPU's or the like, within client devices 106-108. This is one of the tools commonly used by "hackers" when attacking a secure system in order to gain access to content, the host environment's processes, or the like. The ICE detector monitors for a set of behaviors that are required in order for an ICE to function correctly. When these behaviors are detected appropriate action may be taken, including inhibiting additional actions by the host environment, sending a detection message, or the like.

In one embodiment, for example, the ICE detection monitor may reside in a computing device and receive a signal from a secure clock and another signal from a system clock. The ICE detection monitor may then compare the signals and if a difference between the signals exceeds a predetermined threshold, the ICE detection monitor may issue a tamper event alert. In another embodiment the signals from the secure clock and system clock are received at the beginning and at the end of a streaming media session. If a difference between the signals exceeds the predetermined threshold, system clock of the computing clock has been tampered indicating a security breach. The ICE detection monitor publisher may then publish a tamper event that includes such information as the type of tampering detected, when it was detected, or the like.

It should be noted, however, that other ICE detection monitor mechanisms may also be employed, including, but not limited to those that may identify operating system command changes, or the like.

Debugger Detection:

This intrusion detection mechanism monitors the host environment for behaviors that could indicate the use of a debugger. This is one of the tools commonly used by "hackers" when attacking a secure system in order to gain access to content. There typically is a specific set of behaviors that are required in order for debugger to function correctly. When these behaviors are detected appropriate action is taken.

Pattern Recognition and Decision Engine:

The objective of this publisher component is to provide effective intrusion detection that can be implemented in or used with existing software to identify when normal behavior is being exhibited by the software. If this publisher component is being able to detect normal behavior then it also gives us the ability to detect abnormal behavior as well. When enough abnormal behavior has been detected, the methodology will provide feedback such that action can be taken. This mechanism obtains samples of important traits needed to monitor the software. In most cases, this equates to a select number of system level calls that access important resources like reading and writing to hard drives, memory, network resources, etc. When a piece of software is running, it may produce a stream of data identifying when important traits that are to be monitored are utilized. The component creates statistical information about the trends of the traits. The trends of the traits are compared to known good trends to determine if they are normal. If there is not enough data to determine the trend of the traits exhibited, the result will be that the behavior is unknown. If there is enough data to make a determination, then the result will be either normal or abnormal. The tamper detector may recognize difficult to determine semi-repetitious and quasi-chaotic patterns and behaviors. This is mostly applied to samples where the data is dynamic. In this case accumulating a certain level of confidence before the decision will be made.

For example, in one such tamper detector, a plurality of parameters may be selected that are associated with a process on the computing device of interest. Data may then be collected for the plurality of parameters. Delta events (a difference between event values) may be employed to generate fingerprints for at least a subset of processes on the computer device. A entropy may then be dynamically determined for the subset of processes, and if the determined entropy exceeds some value unauthorized behavior may be said to be detected. One embodiment of a pattern recognition and decision engine component useable as a publisher to perform such actions is described in more detail in a co-pending U.S. patent application Ser. No. 11/150,357, entitled "Apparatus, System, And Method For Protecting Content Using Fingerprinting And Real-Time Evidence Gathering," filed Jun. 10, 2005, by Oscar Zhuk et al., which is hereby incorporated by reference in its entirety within.

Another example of a pattern recognition tamper detector useable as a publisher may employ behavior analysis is similar to the principle of so-called Artificial Immune System (AIS). One such AIS tamper detector is described in U.S. patent application Ser. No. 10/020,524, entitled "Method And Apparatus For Protection Of Electronic Media," filed on Dec.

14, 2001, which is hereby incorporated by reference within in its entirety. In that AIS tamper detector, a variety of detectors (e.g., sequences of different types of computer system calls) are sent to a client process and the responses are evaluated to detect the presence of an unauthorized software behavior on the client. For example a comparison between the response and the detector may be performed according to a matching rule that is associated with the detector sent. Unauthorized behaviors include alteration of a client process as well as simultaneously running processes that might enable unauthorized copying of protected media. When a detector indicates unauthorized behavior, that detector may be distributed to other client processes, devices, or the like, to determined if the unauthorized behavior is detected on more than one client device, process, or the like.

In one embodiment, the sequences of different types of computer system calls can be created to reflect known unauthorized patterns of behaviors, while in another embodiment, the sequences can be randomly generated to attempt to detect previously unseen behaviors.

Debugger Immunity:

This publisher component takes advantage of the architectural limits of software systems and immunizes against the use of debuggers. During immunization attempts, if the existence of a pre-existing debugger is detected then an intrusion is reported.

Recorder Detection:

This publisher component monitors the system for processes that are not permitted to execute. A list of "Forbidden Processes" is introduced to the publisher through business rules. In one embodiment, these rules may be updated at setup. The forbidden process publisher leverages process enumeration functionality of the operating system to compare the current operating set of applications and libraries against the list of those processes. This mechanism is typically employed with behavior-based methods, as "list based only" detection is easily defeated.

Screen Scraper Detection:

This intrusion detection mechanism monitors the system for attempts to copy media from the screen, network stack or from the display subsystem using kernel events, graphical display interface (GDI) interceptors, and/or network stack elements.

Trusted Time Master:

This service provides a trusted (secure) time master for use by other publisher components or other authorized subscribers. This time master and its agents can be used to identify hacking attempts, maintain time sync of electronic program guides, or time sensitive security mechanisms (keys, passwords, etc.)

Stealth Agents:

The concept of stealth agents has been developed in order to hide certain security mechanisms within the open host computing environments. Normal monitoring applications are monolithic in nature and subject to static and dynamic attacks. Stealth agents may monitor for various abnormal actions, including, but not limited to performing operating system commands, attempts to install, remove, and/or modify an application, operating system component, or the like. If it is determined that an attack on the system is active then responses can range from reporting and logging the activity to actively attacking the offending modules or even shutting down the system in an orderly or catastrophic manner.

Host Intrusion Detect:

This mechanism may use many of the application level intrusion detection techniques described above in order to detect unwanted intrusions onto the host. In a video/audio environment where content protection post decryption is required, it may be undesirable to have someone using a second computer to remove the content and then steal the content on the second computer. This component looks for the behaviors common to remote access of video/audio content and takes appropriate action.

Filter Graph Tamper Detector:

The DCP Filter Graph Tamper Detector detects changes to the files that implement the filters in a VSC decryption/playback filter graph. To accommodate normal changes that occur during software upgrades, in one embodiment, a limited number of changes to the filters in the graph per time unit may be allowed. More frequent modifications, as would likely be observed during development of a hack attempt against the copy protection, may then be disallowed. A digital signature that includes, but is not limited to: file name, md5sum, modification time and file size, may be computed for each module in the graph. The Filter Graph Tamper Detector can determine that a filter has been modified by comparing the computed signature with its history of observed signatures. The history contains a time-stamped list of the unique digital signatures for each component. The detection sensitivity setting may, in one embodiment, be defined as a maximum number of allowed changes per some time unit. For example, two changes to each filter per day might be allowed. The detection sensitivity setting is configurable. Any time the change frequency exceeds the allowed level, an alert may be sent to a tamper event subscriber. In one embodiment, the alert is sent as a tamper event object that may include the unique digital signatures in the history. The information in this alert can be used to generate a "black-list" of filters that may be disallowed. In addition, decryption may be disabled or playback stopped when the change detection limit is exceeded.

Tamper Event Subscribers

A variety of subscribers may be implemented, depending on the platform. Subscribers 'consume' the above described tamper events and take action according to business rules, and/or other core rules. Such subscribers may reside within the Client Device, and/or a server device to perform various actions, including, but not limited to terminating a media stream; disabling decryption of a key and/or the media; terminating a 'forbidden' application, activity, or action; forcing a reboot of the tampered system; signaling a component such as hardware to perform a shutdown; reporting the tamper event, for example, to an external system, operator, or the like; or even disenfranchising a subscriber to the media, or the like.

Because the invention may be constructed of components bound through associations; the functionality can be scaled up or down and be enhanced as required. This enables the ability to update small sections of code to address exploits and new business requirements.

Since software tamper detection is currently a very dynamic area with new attack methods and countermeasures are being discovered on a regular basis. It may be impossible to predict the time and form of the next attack from the hacker community. However, through the use of a plurality of publishers and subscribers that may be readily downloaded over the network, one embodiment is dynamic and capable of frequent updates. The components are upgradeable to respond to changing threats and new hacking tools and techniques. Upgrades may be controlled remotely from the network operations center (such as server 102 of FIG. 1, or the like) without any client interaction required.

Moreover, one embodiment may act and implements itself independently as a separate software module and does not intrude or impair any applications, system or process activities. It simply watches what is going on at the security level.

If a violation is detected then it intervenes at the system operations level to take necessary security measures as determined by business rules. They might include informing the user about a violation, informing the service operator about a violation, or a more aggressive response especially in the disconnected mode.

Figure 6:
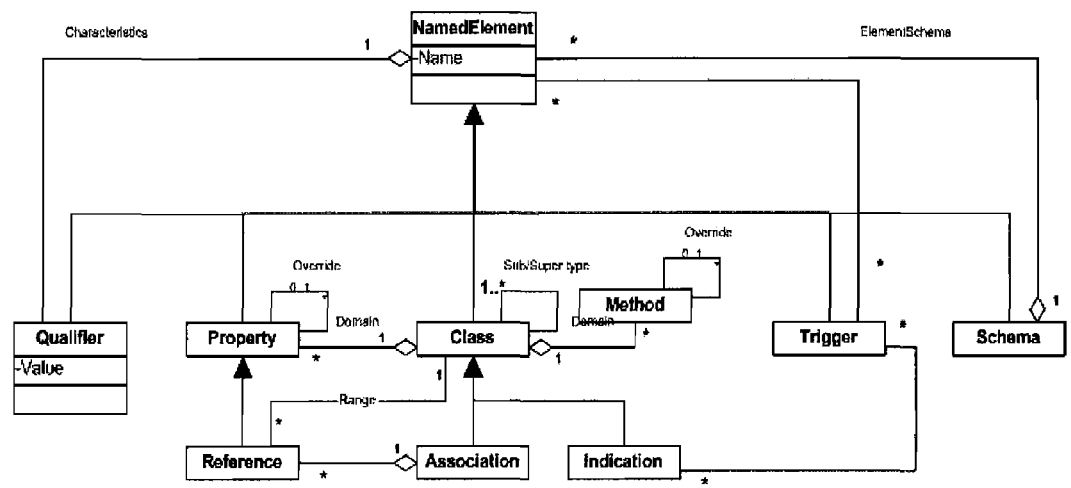
FIG. 6 shows one embodiment of a general meta-model for use in practicing the invention.

FIG. 6 shows one embodiment of a general meta-model for use in practicing the invention. General meta-model 600 may be used to implement system 500 of FIG. 5. However, the invention is not so limited, and other meta-models may be employed by the invention, without departing from the present scope or spirit of the invention.

Figure 7:
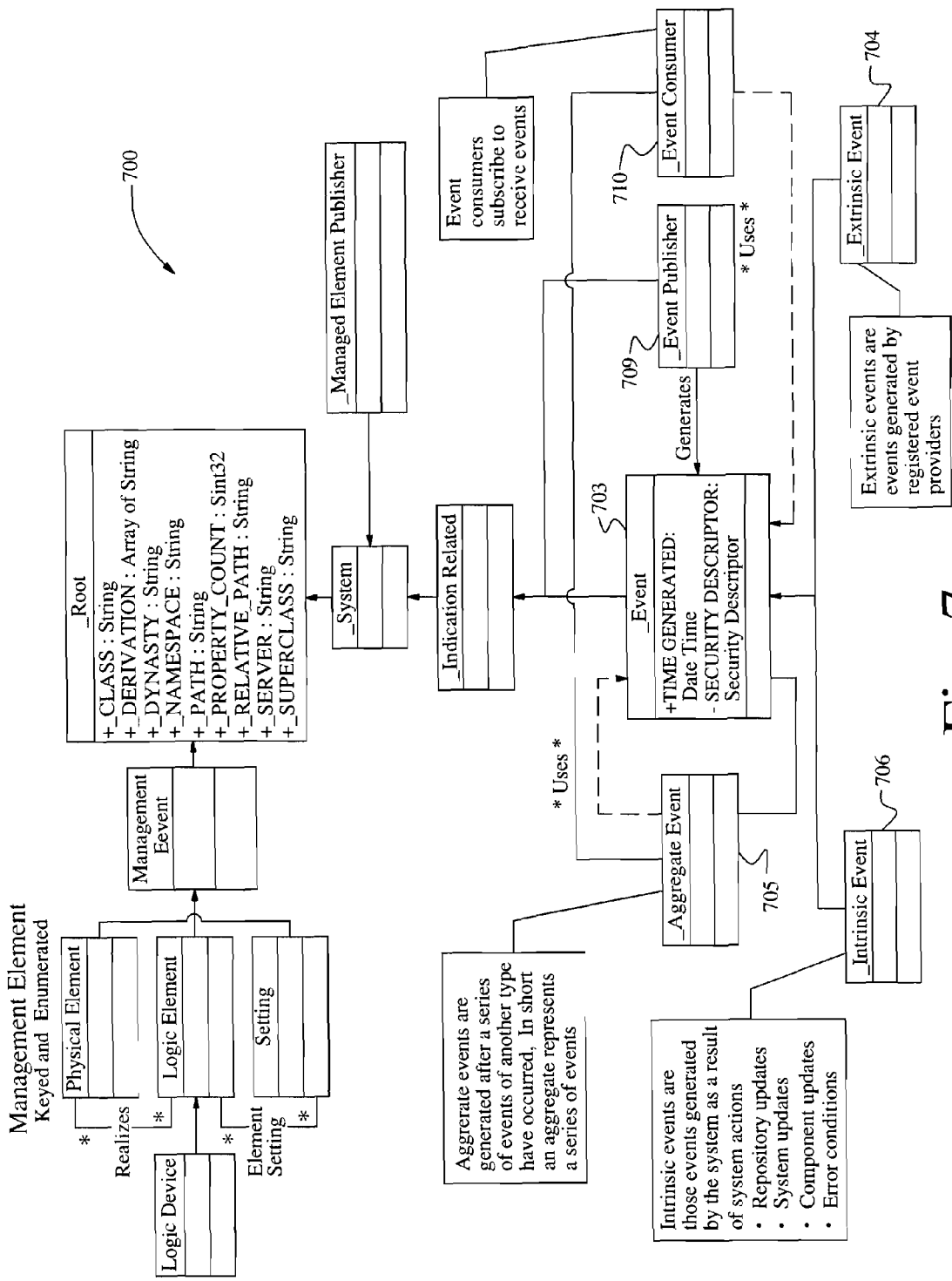
FIG. 7 shows one embodiment of a general schema for use in practicing the invention.

FIG. 7 shows one embodiment of a general schema for use in practicing the invention, in accordance with the invention. However, the invention may also employ other schemas.

As shown in FIG. 7, schema 700 includes event publisher 709, and event consumer (subscriber) 710, such as described above. Also shown, is one embodiment of a tamper event 703 that may include time information, a security descriptor, and the like. In one embodiment, root 702 provides further object oriented information about tamper event 703, including a class, path, server information, or the like. As shown, tamper event 703 may be generated based on extrinsic events 704, or aggregate events 705. Extrinsic events 704 include, for example, those tamper events that may be generated by one or more event publishers. Aggregate events 705 include those tamper events that may be generated after a series of tamper events of various types have occurred.

Intrinsic events 706 include, for example, those events that may be generated by the publisher/subscriber architecture, and include repository updates, system status, component updates, error conditions, or the like.

Generalized Operation

Figure 8:
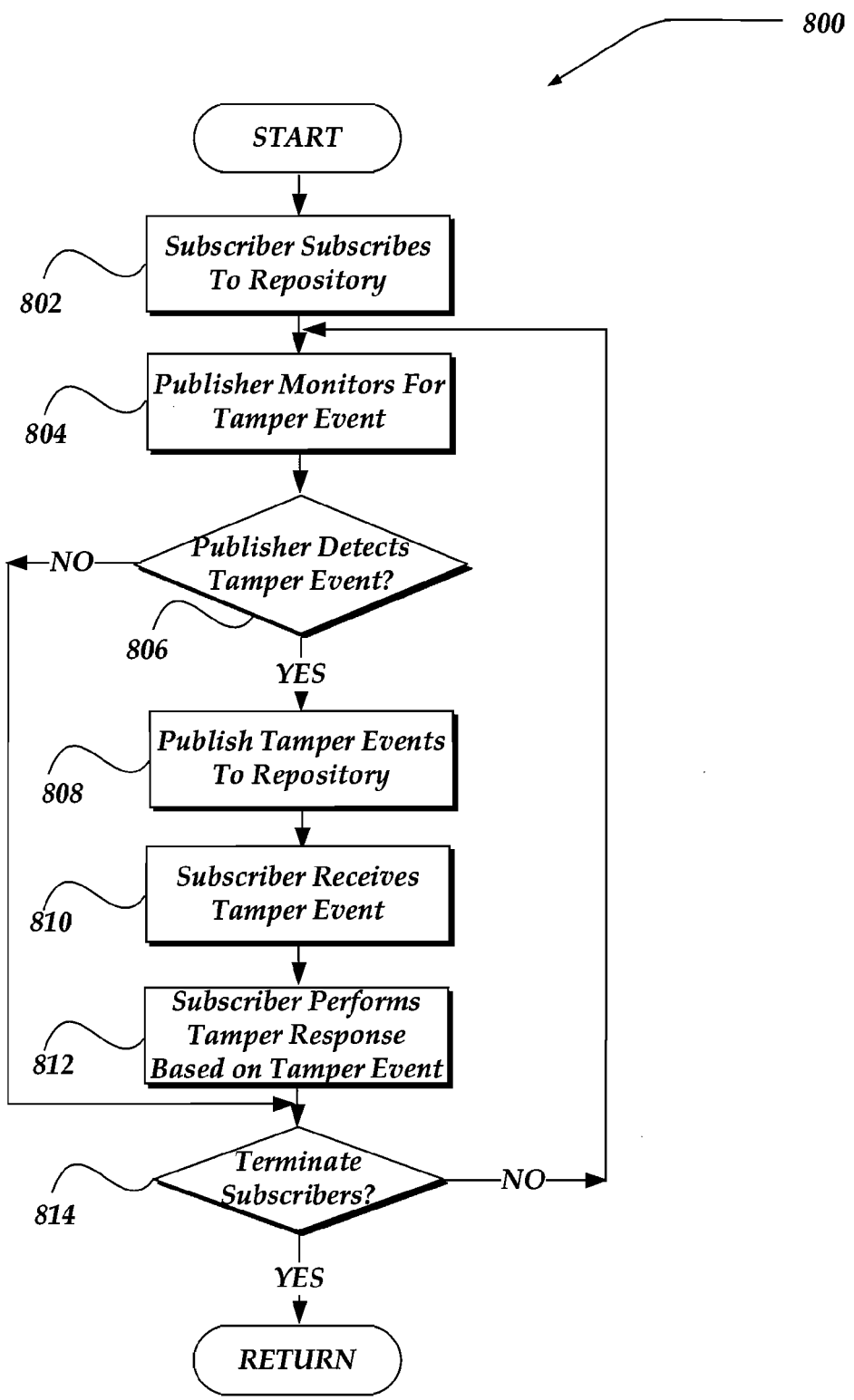
FIG. 8 illustrates a flow diagram showing one embodiment of an overview process for detecting and preventing tampering events using a publisher/subscriber architecture, in accordance with the invention.

The operation of certain aspects of the invention will now be described with respect to FIG. 8. FIG. 8 illustrates a flow diagram showing one embodiment of an overview process for detecting and preventing tampering events using a publisher/subscriber architecture, in accordance with the invention.

Process 800 may be implemented within one or more components of FIG. 1. For example, publisher's actions may be implemented within one or more of clients 106-108, while subscriber's actions may be implemented within one or more of clients 106-108, and/or media provider 102, or the like. Typically, prior to process 800 one or more publishers and/or subscribers may be provided to one or more clients 106-108. In one embodiment, the one or more publishers and/or subscribers may be provided while media is also provided to the clients 106-108, prior to providing the media, or the like.

Process 800 of FIG. 8 then begins, after a start block, at block 802 where a subscriber, such as those described above, subscribes to receive tamper events. In one embodiment, the subscriber may provide a message, signal, or the like, over a network, channel or the like, indicating its presence. In one embodiment, the subscriber may register itself with publishers, a mediator, or the like. In one embodiment, the subscriber may employ digital certificates, digital signatures, or the like, to identify itself, and to register for receipt of tamper events. In one embodiment, the subscriber may have been registered prior to sending the subscriber to the client. However, registration may also be performed after the subscriber is one the client.

In addition, the one or more publishers may also register themselves to the subscribers, a repository, and/or a mediator. In one embodiment, the publishers may also employ digital certificates, digital signatures, or the like. In one embodiment, communications may be performed over a secure channel, using any of a variety of encryption techniques.

Processing flows next to block 804, where one or more publishers may perform various actions to monitor for a tamper event. Such tamper detection events include, but are not limited to those described above.

Processing then flows to decision block 806 where a determination is made whether a tamper event is detected. If a tamper event is detected, processing flows to block 808; otherwise, processing may branch to decision block 814, where a determination may be made whether to terminate subscribers. If subscribers are terminated, then the subscribers may be deleted. In one embodiment, the publishers may also be deleted. Such actions may occur, for example, when the media being protected no longer needs to be protected, for various reasons, no longer resides on, or is accessible to the client, or the like. Processing may return to a calling process to perform other actions. If subscribers are not to be terminated, then processing may loop back to block 804 to continue monitoring for tamper events.

At block 808, the publisher may publish the detected tamper event for access by one or more subscribers. Publication may include publishing an identifier of the tamper event, characteristics associated with the tamper event, such as a time the tampering is detected, a client component that is determined to be tampered with, actions by the component, the media that may be affected, or the like. In one embodiment, the publication of the tamper event includes publishing the tamper event to a mediator that may then provide the tamper event to a repository, and/or to one or more subscribers.

Thus, at block 810 one or more subscribers may receive the tamper event. In one embodiment, the tamper event is provided using a push mechanism. In another embodiment, subscribers may actively seek out to determine if a tamper event exists, using a pull mechanism. In one embodiment, the tamper event may be directed to a specific subscriber, such as a subscriber configured to perform a particular action.

In another embodiment, the tamper event may also be published also be to one or more publishers. In this manner, the publishers may learn about the tamper event, seek to change its monitoring mechanism, look for related tamper detection, or the like. In one embodiment, the publication may be sent to publishers on a client different from the publisher that detected the tamper event at block 804. By doing so, that other publisher may learn and perform monitoring for that specific tamper event, or even associated tamper events.

In any event, processing continues to block 812, where a subscriber may perform one or more actions, based on various business rules, or the like, in response to the received tamper event. For example, the subscriber may service interruption, revocation of rights, renewal of keys associated with encryption of the media, or the like. Processing then flows to decision block 814, to perform actions as described above.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server device for use in detecting tampering on a client device over a network, comprising:
    a storage repository that is configured to remotely store tamper event objects for a plurality of client devices; and
    a hardware processor that is configured to perform actions, including:
    providing at least one publisher code component to each of the plurality of client devices, wherein the at least one publisher code component is configured to monitor for an unauthorized action on a corresponding client device, and if the unauthorized action is detected, enabling the at least one publisher code component to publish a tamper event object to the storage repository, wherein the tamper event object stores an indication of tampering for the corresponding client device;
    providing at least one subscriber code component to each of the plurality of client devices while providing at least a portion of media content to one or more of the client devices, wherein the at least one subscriber code component executing on each client device is operative to register to consume a plurality of tamper event objects and to apply specific business rules to each consumed tamper event object and is configured to subscribe to the storage repository, receive tamper event objects from the storage repository that are published by the at least one publisher code component on each of the plurality of client devices, and based on the received tamper event objects, and at least one business rule, to perform at least one defensive action to inhibit the unauthorized action for each of the plurality of client devices;
    enabling at least one of the subscriber code components and at least one of the publisher code components to initiate registration with each other, wherein each subscriber code component is operable to receive tamper event objects from each respectively registered publisher code component;
    enabling each publisher code component to publish tamper event objects to at least one of the other publisher code components; and
    enabling another publisher code component to subscribe to the storage facility and receive the published tamper event objects, wherein the published tamper event objects are employed by the other publisher code component to detect a presence of the unauthorized action associated with the published tamper event object on another client device.

2. The server of claim 1, wherein the at least one publisher code component is configured to operate as at least one of an ICE detector, debug detector, pattern recognition detector, or a screen scraper detector.

3. The server of claim 1, wherein the at least one subscriber code component receives the tamper event object using a pull protocol mechanism.

4. The server of claim 1, wherein the storage repository is managed through a mediator code component that is configured to manage receipt of the tamper event objects and to distribute the tamper event objects to one or more subscriber code components and one or more publisher code components.

5. The server of claim 1, wherein the tamper event objects are encrypted.

6. The server of claim 1, wherein the at least one subscriber code components is provided to another client device, and wherein the at least one subscriber code component executing on the other client device subscribes to the storage repository, receives published tamper event objects that originated from the client device, and performs at least one defensive action based on the tamper event objects and at least one business rule.

7. A system that is arranged to respond to unauthorized actions on a plurality of client devices, the system comprising:
    a storage repository that is configured to remotely store tamper event objects for the plurality of client devices;
    a publisher code component executing on a hardware processor on each client device that is configured to monitor for an unauthorized action on a corresponding client device, and if the unauthorized action is detected, enabling the publisher code component to publish a tamper event object to the storage repository, wherein the tamper event object stores an indication of tampering at the corresponding client device;
    a subscriber code component that is provided to each client device while a portion of media content is provided to the client device, wherein the provided subscriber code component executing on each client device is operative to register to consume a plurality of tamper event objects and to apply specific business rules to each consumed tamper event object and is configured to subscribe to the storage repository, receive tamper event objects from the storage repository published by each publisher code component for the plurality of client devices, and based on the received tamper event objects, and at least one business rule, to perform at least one defensive action to inhibit the unauthorized action for each of the plurality of client devices;
    enabling at least one of the subscriber code components and at least one of the publisher code components to initiate registration with each other, wherein each subscriber code component is operable to receive tamper event objects from each respectively registered publisher code component;
    enabling each publisher code component to publish the tamper event object to at least one of the other publisher code components; and
    enabling another publisher code component to subscribe to the storage facility and receive the published tamper event objects, wherein the published tamper event objects are employed by the other publisher code component to detect a presence of the unauthorized action associated with the published tamper event object on another client device.

8. The system of claim 7, wherein at least one other subscriber code component and at least one other publisher code component are configured to reside on a server device.

9. The system of claim 7, wherein another subscriber code component is configured to reside on a server device, and wherein the other subscriber code component performs at least another defensive action comprising at least one of terminating a media stream to a client device, disabling a decryption key associated with the media stream, or terminating an application.

10. The system of claim 7, wherein the publisher code component employs at least one of a sequence of different types of computer system calls and related responses to evaluate a presence of unauthorized action, or a digital fingerprint that is generated based on a plurality of parameters that are employed to generate delta events and an associated entropy and if the associated entropy exceeds a determined value detecting the unauthorized action.

11. The system of claim 7, wherein the tamper event objects further comprise a time indicating when the unauthorized action is detected, and an identifier indicating a type of unauthorized action detected.

12. A method for managing responses to unauthorized actions on a plurality of hardware client devices over a network, the method comprising:

provide to each hardware client device a plurality of different publisher code components, each publisher code component being configured to employ a different detection code mechanism for detecting unauthorized actions on a corresponding client device;

providing one or more subscriber code components to each client device while providing at least a portion of media content to each client device, wherein the one or more subscriber code components executing on each client device is operative to register to consume a plurality of tamper event objects and to apply specific business rules to each consumed tamper event object;

if an unauthorized action is detected on at least one of the plurality of client devices by at least one of the plurality of different publisher code components, publishing information about each unauthorized action in a separate tamper event object, wherein each published tamper event object stores an indication of tampering at a corresponding client device, and wherein the plurality of published tamper event objects are remotely stored in a storage repository;

receiving the plurality of published tamper event objects by the one or more subscriber code components residing on each client device and subscribed to the storage repository, wherein the plurality of published tamper event objects are received from the storage repository;

in response to receiving the plurality of published tamper event objects, performing by each subscriber code component at least one action, based on the received published tamper event objects and at least one business rule, that is directed towards deterring the detected unauthorized action on each of the plurality of client devices;

enabling at least one of the subscriber code components and at least one of the publisher code components to initiate registration with each other, wherein each subscriber code component is operable to receive tamper event objects from each respectively registered publisher code component;

enabling each publisher code component to publish the separate tamper event object to at least one of the other publisher code components; and enabling another publisher code component to subscribe to the storage facility and receive the published tamper event objects, wherein the published tamper event objects are employed by the other publisher code component to detect a presence of the unauthorized action associated with the published tamper event object on another client device.

13. The method of claim 12, wherein the published separate tamper event object is published over an encrypted communications channel.

14. The method of claim 12, wherein another subscriber code component resides on a server, and performs at least one of terminating a transmission to at least one of the plurality of client devices, disabling a decryption key, or terminating an application associated with each detected unauthorized action.

15. The method of claim 12, wherein providing each client device a plurality of different publisher code components, further comprises providing at least one of the publisher code components within a stream of media content to the plurality of client devices.

16. A non-transitory computer-readable storage medium having program instructions stored thereon, the program instructions being executable by a processor on a computing device to enable actions for managing responses to unauthorized actions on a plurality of client devices over a network comprising:

providing to each client device a plurality of different publisher code components, each publisher code component being configured to employ a different detection code mechanism for detecting unauthorized actions on a corresponding client device;

providing one or more subscriber code components to each client device while providing at least a portion of media content to each client device, wherein the one or more subscriber code components executing on each client device is operative to register to consume a plurality of tamper event objects and to apply specific business rules to each consumed tamper event object;

if an unauthorized action is detected on at least one of the plurality of client devices by at least one of the plurality of different publisher code components, publishing information about each unauthorized action in a separate tamper event object, wherein each published tamper event object stores an indication of tampering at a corresponding client device, and wherein a plurality of published tamper event objects are remotely stored in a storage repository;

receiving the plurality of published tamper event objects by the one or more subscriber code components subscribed to the storage repository and residing on each client device, wherein the plurality of published tamper event objects are received from the storage repository;

in response to receiving the plurality of published tamper event objects, performing by each subscriber code component at least one action, based on the received published tamper event objects and at least one business rule, that is directed towards deterring the detected unauthorized action on each of the plurality of client devices;

enabling at least one of the subscriber code components and at least one of the publisher code components to initiate registration with each other, wherein each subscriber code component is operable to receive tamper event objects from each respectively registered publisher code component;

enabling each publisher code component to publish at least one of the plurality of tamper event objects to at least one of the other publisher code components; and enabling another publisher code component to subscribe to the storage facility and receive the published tamper event objects, wherein the published tamper event objects are employed by the other publisher code component to detect a presence of the unauthorized action associated with the published tamper event object on another client device.

17. A non-transitory computer-readable storage medium having computer-executable instructions for managing responses to unauthorized actions, the computer-executable instructions when installed onto a plurality of client devices enable each client device to perform actions, comprising:

receiving a publisher code component for each client device, that is configured to detect an unauthorized action on a corresponding client device;

providing one or more subscriber code components to each client device while providing at least a portion of media content to each client device, wherein the one or more subscriber code components executing on each client device are operative to register to consume a plurality of tamper event objects and to apply specific business rules to each consumed tamper event object;

if the publisher code component detects an unauthorized action on the corresponding client device, publishing a tamper event object that includes at least a time of detection of the unauthorized action, and an identifier associated with the unauthorized action, wherein the published tamper event object is remotely stored in a storage repository for a plurality of tamper objects;

receiving by the one or more subscriber code components subscribed to the storage repository and residing on each client device the plurality of tamper event objects, wherein the plurality of tamper event objects are received from the storage repository, and wherein the one or more subscriber code components are configured to perform at least one action, based on the plurality of tamper event objects and at least one business rule, directed to deterring the unauthorized action on each of the plurality of client devices;

enabling at least one of the subscriber code components and at least one of the publisher code components to initiate registration with each other, wherein each subscriber code component is operable to receive tamper event objects from each respectively registered publisher code component;

enabling each publisher code component to publish the at least one of the plurality of tamper event objects to at least one of the other publisher code components, and enabling another publisher code component to subscribe to the storage facility and receive the published tamper event objects, wherein the published tamper event objects are employed by the other publisher code component to detect a presence of the unauthorized action associated with the published tamper event object on another client device.

18. The non-transitory computer-readable storage medium of claim 17, wherein another client device is configured to receive another publisher code component that is configured to receive the published tamper event object and employ the published tamper event object to monitor for the unauthorized action on the other client device.

19. The non-transitory computer-readable storage medium of claim 17, wherein the publisher code component is configured to employ at least one of the following detection mechanisms: an integrated circuit emulator detector, a pattern recognition detector, or a screen scraper detector.

20. The non-transitory computer-readable storage medium of claim 17, wherein publishing the tamper event object further comprises providing the published tamper event object over a secure communications channel.

* * * * *